US009280148B1

(12) United States Patent
Colett et al.

(10) Patent No.: US 9,280,148 B1
(45) Date of Patent: Mar. 8, 2016

(54) SYSTEM AND METHOD FOR ELECTRONICALLY TAGGING ITEMS FOR USE IN CONTROLLING ELECTRICAL DEVICES (71) Applicant: Intel Corporation, Santa Clara, CA (US)

(72) Inventors: Hannah R. Colett, Hillsboro, OR (US); Philip J. Corriveau, Carlton, OR (US); Rina A. Doherty, Forest Grove, OR (US); James J. Scovell, Beaverton, OR (US); Sarah Jihye Han, Hillsboro, OR (US); Yinni Guo, San Jose, CA (US); Dalila Szostak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/496,161

(22) Filed: Sep. 25, 2014

(51) Int. Cl.
*G06F 19/00* (2011.01)
*G05B 15/02* (2006.01)

(52) U.S. Cl.
CPC .................................... *G05B 15/02* (2013.01)

(58) Field of Classification Search
CPC ............ G05B 15/02; H01L 2924/0002; H01L 2924/00; F25D 2700/08; F25D 29/00; F25D 11/02; F25D 17/042; F25D 23/00; F25D 2400/08; F25D 2400/36; F25D 2400/361; F25D 2500/06; F25D 25/025; F25D 2700/06
USPC .......................... 235/385, 375, 382, 380, 492
See application file for complete search history.

(56) References Cited

U.S. PATENT DOCUMENTS

| | | | | |
|---|---|---|---|---|
| 6,001,065 A * | 12/1999 | DeVito | ......................... | 600/544 |
| 9,040,881 B2 * | 5/2015 | McIntyre et al. | ............. | 219/506 |
| 2002/0069276 A1 * | 6/2002 | Hino et al. | ..................... | 709/223 |
| 2005/0016996 A1 * | 1/2005 | Chun | ........................... | 219/685 |
| 2006/0150689 A1 | 7/2006 | Kim et al. | | |
| 2008/0066475 A1 * | 3/2008 | Cho et al. | ........................ | 62/130 |
| 2010/0283573 A1 * | 11/2010 | Yum et al. | ..................... | 340/3.1 |
| 2010/0286801 A1 * | 11/2010 | Yum et al. | ...................... | 700/90 |
| 2012/0265348 A1 | 10/2012 | Kim et al. | | |
| 2013/0090773 A1 * | 4/2013 | Park et al. | ..................... | 700/286 |

FOREIGN PATENT DOCUMENTS

| | | |
|---|---|---|
| JP | 2008-194153 A | 8/2008 |
| KR | 10-2009-0076722 A | 7/2009 |
| KR | 10-2013-0020375 A | 2/2013 |

OTHER PUBLICATIONS

International Search Report and Written Opinion received for PCT Patent Application No. PCT/US2015/039389, mailed on Oct. 22, 2015, 14 Pages.

* cited by examiner

*Primary Examiner* — Thien M Le
(74) *Attorney, Agent, or Firm* — Inventive Patent Law, P.C.; Jim H. Salter (57) ABSTRACT

A system and method for electronically tagging items for use in controlling electrical devices are disclosed. A particular embodiment includes: a controller; a tag reader interface in data communication with the controller, the tag reader interface being configured to receive item information read from an electronically readable tag attached to an item placed in an electrical device; a display device driver in data communication with the controller for driving the display of operational messages for a user/operator of the electrical device, the operational messages being based on the item information; and an appliance interface in data communication with the controller for receiving control commands from the controller and for issuing corresponding control signals for controlling the electrical device, the control commands being based on the item information.

15 Claims, 9 Drawing Sheets

```
          ┌─────────────────────────────────────────────┐
          │   Processing Logic for Electronically Tagging Items
          │     for use in Controlling Electrical Devices
          │                    -1100-
          └─────────────────────────────────────────────┘
                              │
                              ▼
   ┌───────────────────────────────────────────────────────────┐
   │ Read an electronically readable tag attached to an item placed in an electrical
   │    device to retrieve item information from the electronically readable tag.
   │                           -1110-
   └───────────────────────────────────────────────────────────┘
                              │
                              ▼
   ┌───────────────────────────────────────────────────────────┐
   │   Generate operational messages and control commands based on the item
   │                         information.
   │                           -1120-
   └───────────────────────────────────────────────────────────┘
                              │
                              ▼
   ┌───────────────────────────────────────────────────────────┐
   │ Display the operational messages for a user/operator of the electrical device, the
   │       operational messages being based on the item information.
   │                           -1130-
   └───────────────────────────────────────────────────────────┘
                              │
                              ▼
   ┌───────────────────────────────────────────────────────────┐
   │  Issue control signals for controlling the electrical device, the control signals
   │              being based on the item information.
   │                           -1140-
   └───────────────────────────────────────────────────────────┘
                              │
                              ▼
              Figure 8        ( End )
```

Figure 9

SYSTEM AND METHOD FOR ELECTRONICALLY TAGGING ITEMS FOR USE IN CONTROLLING ELECTRICAL DEVICES

TECHNICAL FIELD

This patent application relates to electronic or electrical systems or devices, appliances, and computer-implemented software, according to various example embodiments, and more specifically to a system and method for electronically tagging items for use in controlling electrical devices.

BACKGROUND

Radio-frequency identification (RFID) is a conventional technology that uses communication via radio waves to exchange data between a reader and an electronic tag attached to an object, typically for the purpose of identification and tracking. Some tags can be read from several meters away and beyond the line of sight of the reader. The application of bulk reading enables an almost parallel reading of a plurality of tags.

Radio-frequency identification involves interrogators (also known as readers), and tags. Most RFID tags contain at least two parts. One part is typically an integrated circuit for storing and processing information, modulating and demodulating a radio-frequency (RF) signal, and other specialized functions. The other part is an antenna for receiving and transmitting the RF signal. RFID tags can be passive RFID tags, which have no power source and require an external electromagnetic field to initiate a signal transmission, or active RFID tags, which contain a battery and can transmit signals once an external source (e.g., an interrogator) has been successfully identified.

RFID technology is used in the apparel and textile manufacturing industry. This technology was introduced in the textile industry many years ago. In the apparel retail sector, RFID is widely used by big retailers for security and for tracking sales stock and real time information. However, RFID and other electronic tagging technologies have not been extensively used for controlling electrical devices.

It can be frustrating and expensive if one fails to keep track of and manage care instructions for clothing. Apparel can be easily ruined if care instructions are not properly followed. Typically, items of clothing have a tag or label sewn inside one of the seams. The tags or labels themselves are sometimes a nuisance and are often cut off or become unreadable due to wear and tear. The information on the tags is also often hard to read and understand. It can also be difficult to match the care instructions on the tag of clothing to the options provided on a clothes washer and dryer. Washers and dryers have become quite sophisticated in the options they provide for specialized care needs; but, it can be overwhelming to remember each and every garment's individual care instructions.

Currently, the way to obtain care instructions for garments is to read the label and try to interpret the symbols and instructions. Sometimes it is even harder to understand symbols and instructions if the clothes are imported from abroad. This can be time-consuming and prone to misinterpretation, which can result in ruined clothing.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for electronically tagging items for use in controlling electrical devices are disclosed. The disclosed embodiments can be used with a wide variety of electrical or electronic devices, appliances, or other electrical equipment, such as clothes washers, clothes dryers, steam cleaners, industrial clothes presses, and the like. Example embodiments are described in more detail below.

Clothes washers, dryers, and other appliances have become quite sophisticated in the options they provide for specialized care needs; but, it can be overwhelming to remember each and every garment's individual care instructions. The various embodiments described herein provide an automated solution to reduce the workload of the appliance user/operator. The various embodiments described herein employ an electronically readable item tag or label, which can be attached or embedded in an item, such as an item of clothing. The electronically readable item tag or label can be automatically read and interpreted by the electrical appliance (e.g., a clothes washer, dryer, etc.) to allow for automatic configuration of the appliance to accommodate the specific needs of a load of items (e.g., a load of laundry) being processed by the appliance. As a result, the various embodiments provide customized care of items and decrease the workload of the user/operator.

In the various embodiments described herein, the electronically readable item tag or label can be a microchip, a radio-frequency identification (RFID) tag, a barcode, a Quick Response (QR) code, or the like embedded in the hem of an item of clothing, attached to a portion of the garment, attached to a garment label, or attached or embedded into an item. The general use of RFID tags, barcodes and QR codes are well known to those of ordinary skill in the art. The various embodiments described herein apply these known technologies to the electronic tagging of items for use in controlling electrical devices as described in more detail below.

In conventional systems, the way to obtain care instructions for garments is for the appliance user/operator to manually read the label and try to interpret the symbols and instructions on the label. Sometimes it is even harder to understand symbols and instructions if the items are imported from abroad or the labels are written in a non-native language. This can be time-consuming for the appliance user/operator and prone to misinterpretation, which can result in ruined clothing or other items.

The various embodiments described herein provide a better solution. As electronically tagged items of a load (e.g., a load of clothing) are placed inside or near an appliance (e.g., a clothes washer, dryer, etc.), a reader attached to the appliance is configured to read the electronically readable item tag or label on each item placed into or near the appliance. A data processor and memory, microcontroller, or other control system in the appliance can record the particular care instructions and other item information encoded into the electronic tag of each item. A variety of item information can be encoded into the electronic tag of each item. For example, the encoded item information can include: the care instructions (e.g., washing, drying, ironing instructions, etc.) of the garment, the garment manufacturer, provenance information, the sourcing of materials and the manufacturing processes used, the date of manufacture and/or purchase, the name or identity of the owner or purchaser, the item stock keeping unit (SKU) number, the size of the garment, the dry weight and wet weight of the garment, the identity of the materials from which the garment is made, safety advisories, storage and disposal advisories, special care instructions or warnings, the number of times the item has been washed or dried, a flammability coding, a water resistance coding, allergen warnings, government or industry rating data, manufacturer identification data, pricing information, liability limitations, copyright or trademark advisories, website or uniform resource locator (URL) links, and the like. The data processor or microcontroller can aggregate and record the retrieved item data for all items in the load being processed by the appliance. An information display on the appliance can show care instructions and item information. This displayed information can include the number of times the item has been washed, the material from which the garment is made, whether it is safe to bleach or iron the item, etc. The appliance (e.g., washer, dryer, etc.) can also automatically suggest washing and drying settings according to the care instructions read from the electronically readable item tag. The suggested settings can be displayed to a user/operator via a light emitting diode (LED) display or other conventional display device on the appliance. If multiple items are present in or near the appliance, the data processor or microcontroller in the appliance can suggest ideal settings based on the care needs of the items in the appliance and/or present a warning that one or more of the items have conflicting care needs. Additionally, for appliances that support an application programming interface (API) provided with an example embodiment, the data processor or microcontroller can automatically configure the settings of the appliance based on the item information read from the electronically readable item tags of the items placed into or near the appliance. For example, the data processor or microcontroller may determine that several delicate garment items have been placed into the appliance (e.g., a clothes washer) by reading the electronic tags of the items in the load. Based on this determination, the data processor or microcontroller can automatically program the washer to use a wash cycle configured for delicate loads. In this manner, an example embodiment can automatically configure the settings of an appliance based on the particular needs or characteristics of the items in a load being processed by the appliance.

Figure 1:
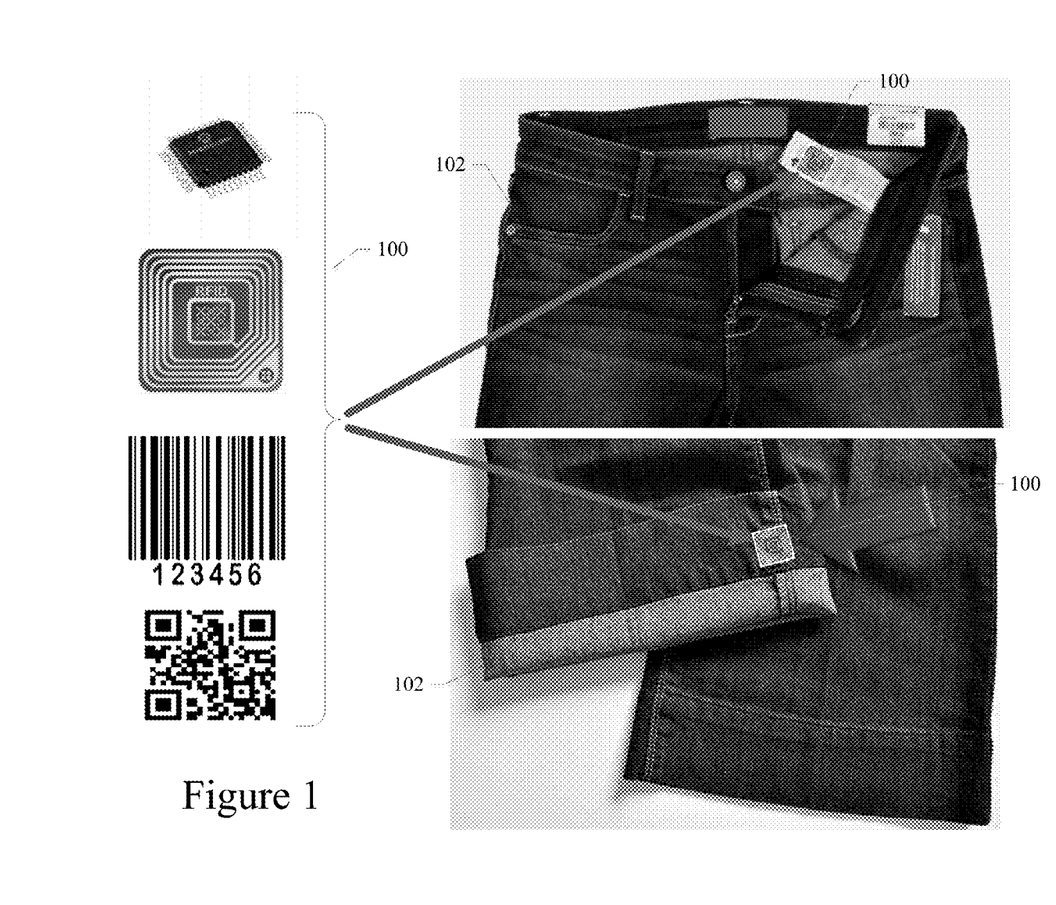
FIG. 1 illustrates an example embodiment for applying an electronically readable tag or label to an item.

Referring now to FIG. 1, an example embodiment is illustrated for applying an electronically readable tag or label on an item. In the particular embodiment shown in FIG. 1, a garment 102 is tagged in any of a variety of ways with an electronically readable item tag or label 100. As shown, the electronically readable item tag 100 can be a microchip, a radio-frequency identification (RFID) tag, a barcode, a Quick Response (QR) code, or the like embedded in the hem of an item of clothing, attached to a portion of the garment, attached to a garment label, or otherwise attached or embedded into an item. In other embodiments, dishware, silverware, or other kitchen or dining utensils can also be tagged with an electronically readable tag or label 100. In still other embodiments, food items, cleaning items, bathroom items, tools, or other household items can also be tagged with an electronically readable tag or label 100. In each case, the electronically readable item tag or label 100 can be configured to be waterproof, wear-resistant, heat and cold resistant, and configured for permanent or semi-permanent attachment to an item or object by adhesive, bonding, stitching, or embedding into the material of the item.

Each electronically readable item tag or label 100 can be encoded with item information pertaining to the item to which the tag 100 is attached. In the case of a microchip or an RFID tag, the information can be read by a reader using a radio frequency (RF) signal receiver as well known to those of ordinary skill in the art. In the case of a barcode or a Quick Response (QR) code, the information can be read by a scanner configured to decode the arrangement of printed shapes in the barcode or QR code image as well known to those of ordinary skill in the art. In each case, the item information encoded into the tag 100 can be read or scanned and transferred to a data processor or microcontroller (generally a controller) for processing. As described above, a variety of item information can be encoded into the electronic tag of each item. As a result, a variety of item-specific information can be electronically passed from the tag 100 on each item to a data processor or microcontroller as described in more detail below.

Figure 2:
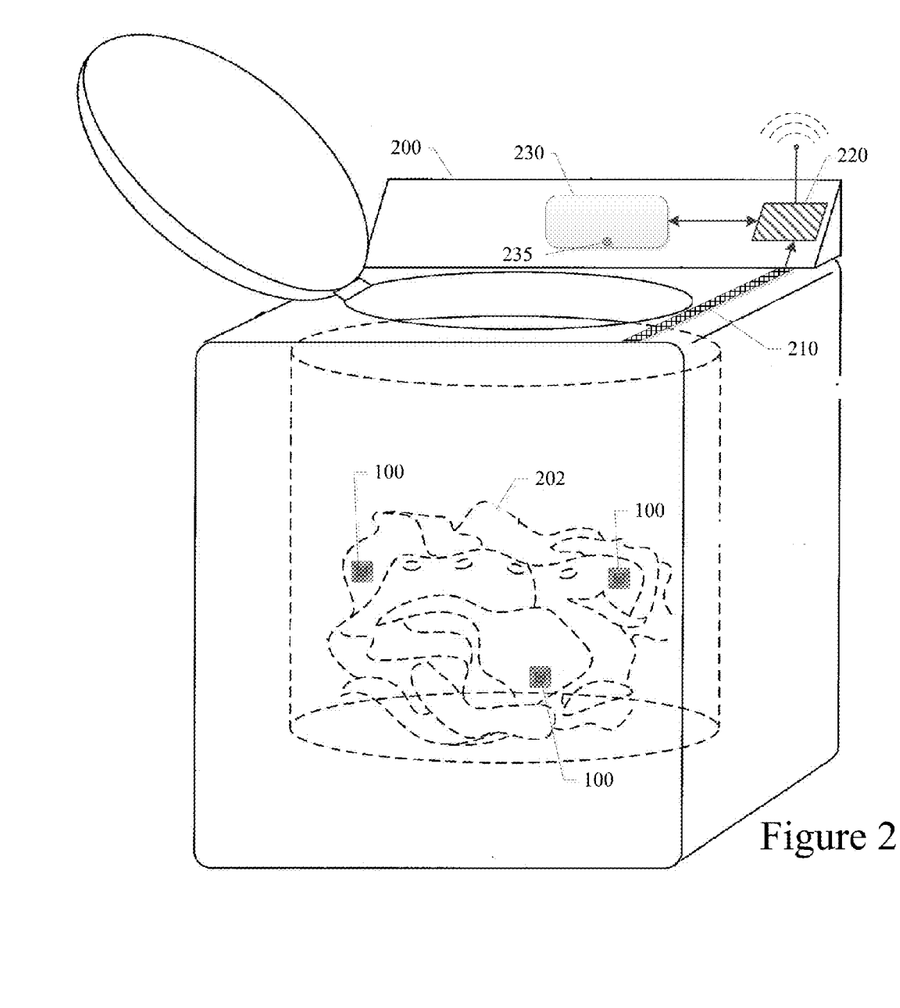
FIG. 2 illustrates a top-loading clothes washer as an appliance of an example embodiment.
Figure 3:
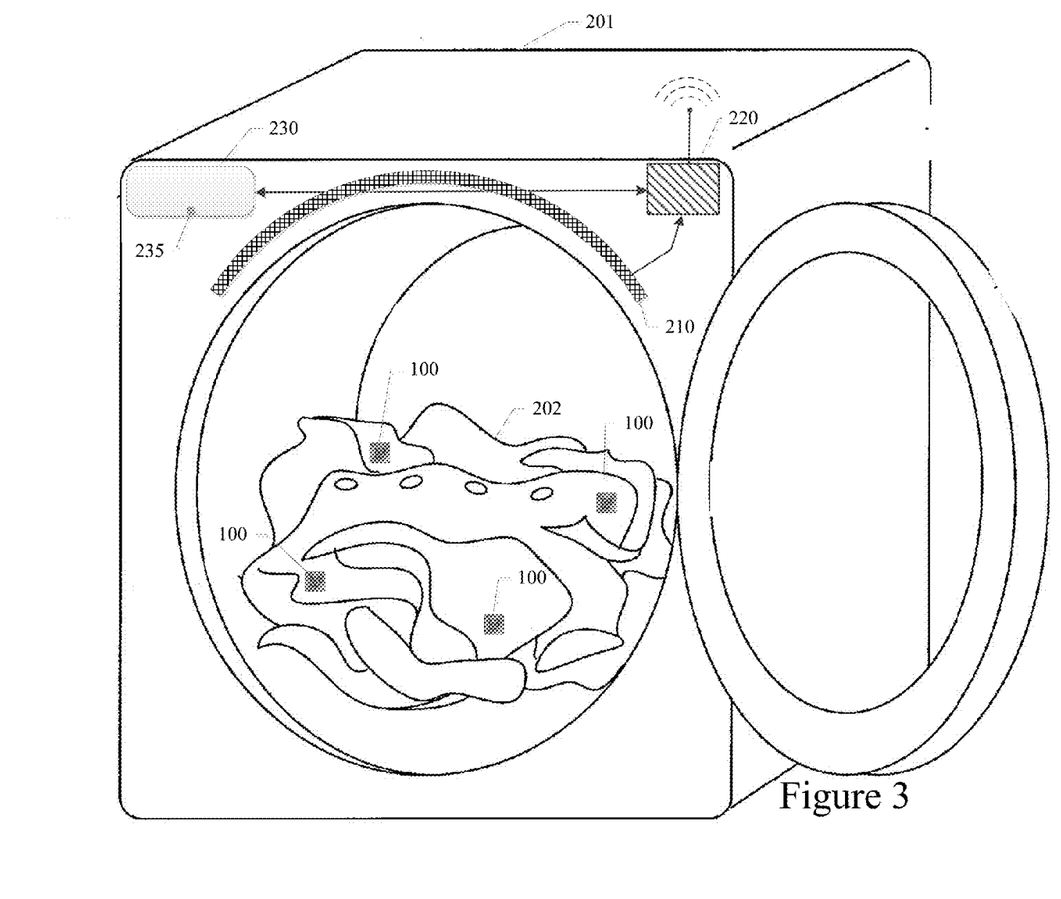
FIG. 3 illustrates a clothes dryer as an appliance of an example embodiment.

Referring to FIGS. 2 and 3, an example embodiment is illustrated for use with any of a variety of appliances, such as the top-loading clothes washer 200 shown in FIG. 2 or the clothes dryer 201 shown in FIG. 3. It will be apparent to those of ordinary skill in the art in view of the disclosure herein that other types of appliances (e.g., dishwashers, refrigerators, and the like) can be configured to include the technologies disclosed herein.

Referring now to FIG. 2, the top-loading clothes washer 200 of an example embodiment is shown to include an RFID reader 210, which can be affixed to the top of the washer 200 near an opening into which clothing items are placed. Such RFID readers are well-known to those of ordinary skill in the art. In a similar fashion, the clothes dryer 201 shown in FIG. 3 can include an RFID reader 210, which can be affixed to the front of the dryer 201 near an opening into which clothing items are placed. As shown in FIGS. 2 and 3, items placed into appliances 200 or 201 can each include electronically readable item tags or labels 100. As these items are placed into appliances 200 or 201, the items come into proximity of the RFID reader 210. As a result, the RFID reader 210 can electronically read the item information encoded into the electronically readable item tag 100 of each item. This item information can be transferred to an appliance control module 220 described in more detail below.

Referring again to FIG. 2, the top-loading clothes washer 200 of an example embodiment is shown to include a barcode or QR code scanner 235, which can be installed in an upper portion of the washer 200 near an opening into which clothing items are placed. Such barcode or QR code scanners are well-known to those of ordinary skill in the art. In a similar fashion, the clothes dryer 201 shown in FIG. 3 includes a barcode or QR code scanner 235, which can be installed in the front of the dryer 201 near an opening into which clothing items are placed. As shown in FIGS. 2 and 3, items placed into appliances 200 or 201 can each include electronically readable item tags or labels 100. However, some items may not have a microchip, RFID tag, or other radio-enabled tag. Some items in load 202 may only include a barcode or QR code on the item label or somewhere on the item. Because these items without a radio-enabled tag cannot be automatically read by the RFID reader 210, the user/operator can pass these items in front of barcode or QR code scanner 235. As a result, the barcode or QR code scanner 235 can electronically read the item information encoded into the electronically readable item tag 100 of each item. This item information can be transferred to the appliance control module 220 described in more detail below.

Referring again to FIG. 2, the top-loading clothes washer 200 of an example embodiment is shown to include a display device 230, which can be installed in an upper portion of the washer 200 and easily visible to the user/operator. The display device 230 can be a standard a light emitting diode (LED) display, plasma display, or other conventional display device. Such display devices are well-known to those of ordinary skill in the art. In a similar fashion, the clothes dryer 201 shown in FIG. 3 can include a display device 230, which can be installed in the front of the dryer 201 and easily visible to the user/operator. The display device 230 can be used to display messages or prompts to the user/operator of the appliance. These messages or prompts can be generated by the appliance control module 220 described in more detail below. In some embodiments, the display device 230 can be a standard touchscreen display device, which accepts user/operator inputs and command selections. These user/operator inputs and command selections can also be transferred to the appliance control module 220 described in more detail below.

Figure 4:
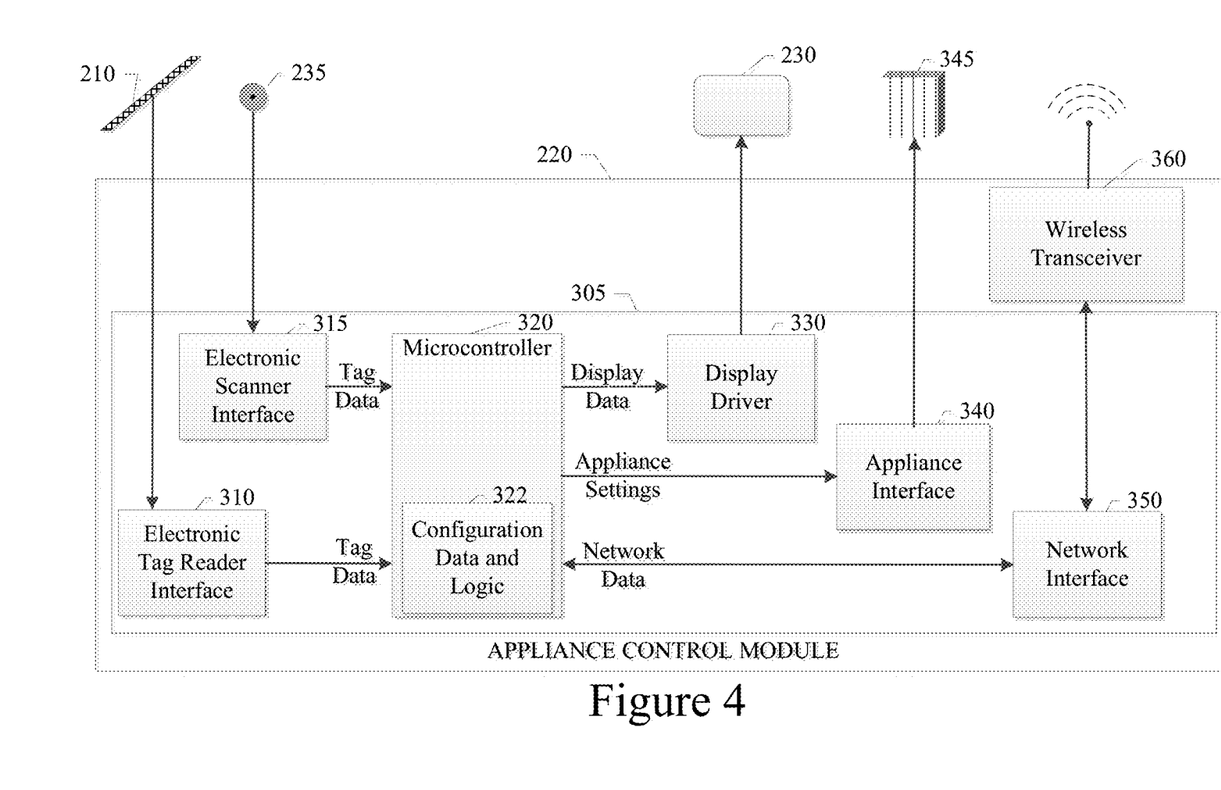
FIG. 4 illustrates the system architecture of an example embodiment of the appliance control module.

Referring now to FIG. 4, the diagram illustrates the system architecture of an example embodiment of the appliance control module 220. As described above, the appliance control module 220 receives item information read from the electronically readable item tags 100 on the items of a load 202 in or near the appliance. The radio-enabled tags 100 can be read by the RFID reader 210. The item information can be received at the appliance control module 220 from the RFID reader 210 by an electronic tag reader interface 310. Using well-known protocols, the electronic tag reader interface 310 can receive electronic signals from the RFID reader 210 and convert the received signals to computer-readable tag data or item data representing the item information read from the tags 100. The item information can be passed to a microcontroller 320. The non-radio-enabled tags 100 in load 202 can be scanned by the barcode/QR code scanner 235. The item information can be received at the appliance control module 220 from the barcode/QR code scanner 235 by an electronic scanner interface 315. Using well-known protocols, the electronic scanner interface 315 can receive electronic signals from the barcode/QR code scanner 235 and convert the received signals to computer-readable tag data or item data representing the item information scanned from the tags 100. The item information can be passed to the microcontroller 320.

Figure 5:
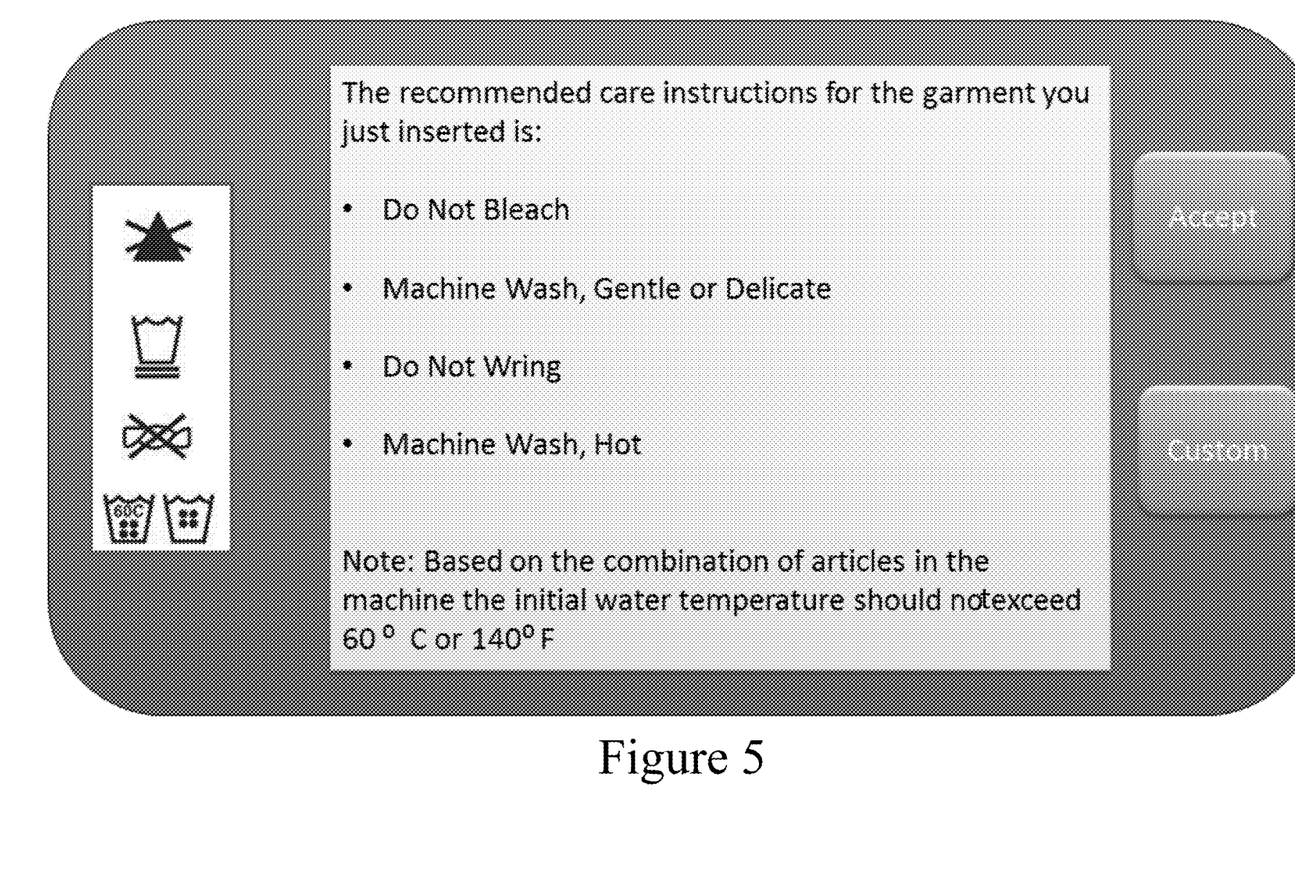
FIGS. 5 and 6 illustrate sample information displays generated by the microcontroller and presented on the display device of an example embodiment.
Figure 6:
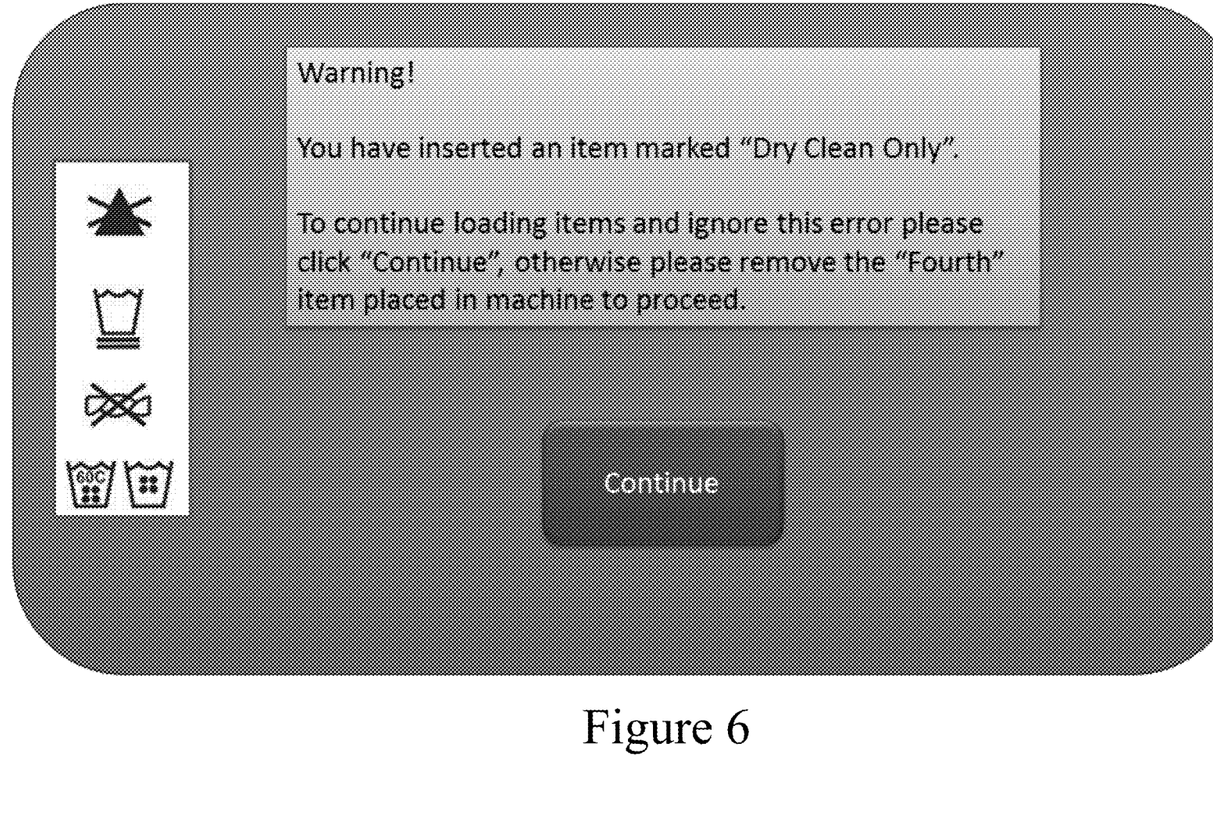

The microcontroller 320 or controller of an example embodiment generally handles the user/operator interface and the automatic control of an appliance based on the item information associated with a load being processed by the appliance. The microcontroller 320 can be a specialized processing module of a particular appliance. Alternatively, the microcontroller 320 can be a general data processor of the appliance. The microcontroller 320 can also be implemented using standard discrete logic components, semiconductor logic, application-specific integrated circuits (ASIC), field programmable gate array (FPGA) components, or any of a variety of conventional electronic components and techniques. In the example embodiment shown in FIG. 4, the microcontroller 320 receives item information read from the tags 100 of items in or near an appliance as described above. The microcontroller 320 can aggregate and record the received item data in a configuration data store and logic element 322 for all items in the load 202 being processed by the appliance. The microcontroller 320 can use logic preconfigured into the configuration data store and logic element 322 to generate information displays for presentation to a user/operator via the display driver 330 and the display device 230. For example, the microcontroller 320 can automatically generate information displays to suggest washing and/or drying settings according to the care instructions read from the electronically readable item tags 100 of the load 202. If multiple items are present in the appliance, the microcontroller 320 can suggest ideal settings based on the aggregated care needs of the items in the appliance and/or present a warning that one or more of the items in the load 202 have conflicting care needs. The microcontroller 320 can suggest appliance settings for the user/operator to approve or reject. The microcontroller 320 can also provide suggestions, such as white clothing should not be washed with dark colored clothing that may bleed or discolor the white clothing. As particular examples for illustration, sample information displays generated by microcontroller 320 and presented on display device 230 are shown in FIGS. 5 and 6. If the user/operator doesn't agree with the suggestions presented on the display device 230 by the microcontroller 320, the user/operator has the option of selecting their own custom wash or dry. Additionally, the user/operator can be prompted to automatically add the appropriate amounts of soap, fabric softener, and bleach based on the load size and clothing types as read from the item tags 100. If an item is placed in the appliance that shouldn't be included in the load 202 (e.g. a dry clean only item or an item that requires a special garment bag), a warning can be displayed on the display device 230 to alert the user/operator (e.g., see FIG. 6). A particular embodiment can also have predefined weight profiles for clothes and can check clothing for forgotten items left in pockets by comparing the weight profiles of items in the load 202 with the current weight of items inside the appliance.

Referring still to FIG. 4, the appliance control module 220 of an example embodiment can automatically configure and control the operation of an appliance based on the item information obtained from the electronically readable tags of the items in the load. For appliances that support an application programming interface (API) 345 provided with an example embodiment, the microcontroller 320 can automatically configure the settings of the appliance based on the information read from the electronically readable tags of the items placed into or near the appliance. An appliance interface 340 is provided in a particular embodiment to convert appliance settings or control signals into a form compatible with an API 345 for a particular class of appliances or electrical devices. As a result, the microcontroller 320 can generate and issue appliance settings or control commands to configure the operation of an appliance. For example, the microcontroller 320 may determine that several delicate garment items have been placed into an appliance (e.g., a clothes washer) by reading the electronic tags of the items in the load. Based on this determination, the microcontroller 320 can use the appliance interface 340 to automatically program the washer to use a wash cycle configured for delicate loads. In this manner, an example embodiment can automatically configure the settings and operation of an appliance based on the particular needs or characteristics of the items in a load being processed by the appliance.

Referring still to FIG. 4, the appliance control module 220 of an example embodiment can include a network interface 350 and a wireless transceiver 360. The combination of the network interface 350 and the wireless transceiver 360 enables the appliance control module 220 to be in network communication with a local area network or a wide area network, such as the Internet. Using well-known network protocols and electrical interfaces, the appliance control module 220 and the microcontroller 320 therein can establish a data connection with various network-accessible external resources, such as servers, websites, and distributed databases. These external resources can be accessed by the appliance control module 220 to enable the appliance control module 220 to gather additional information related to items detected in a particular load. For example, the appliance control module 220 can use item information read from an electronically readable item tag to retrieve additional information pertaining to the item from an external resource. As a result, the appliance control module 220 can retrieve a highly detailed set of item information from external resources based on item information read from an electronically readable item tag. The appliance control module 220 can also use the network interface 350 to retrieve a highly detailed set of additional appliance information pertaining to a particular appliance or electrical device being controlled by the appliance control module 220. The appliance control module 220 can use this additional appliance information to more accurately and robustly control the operation of the appliance. Moreover, the appliance control module 220 can use the network interface 350 to retrieve additional configuration data and logic for storage in configuration data and logic store 322 and use by the appliance control module 220. Additionally, the network interface 350 can be used by authorized external network resources to monitor and control the operation of the appliance control module 220 from a remote site. In this manner, the appliance control module 220 at one or more sites can be networked together and controlled or monitored by a network host.

Figure 7:
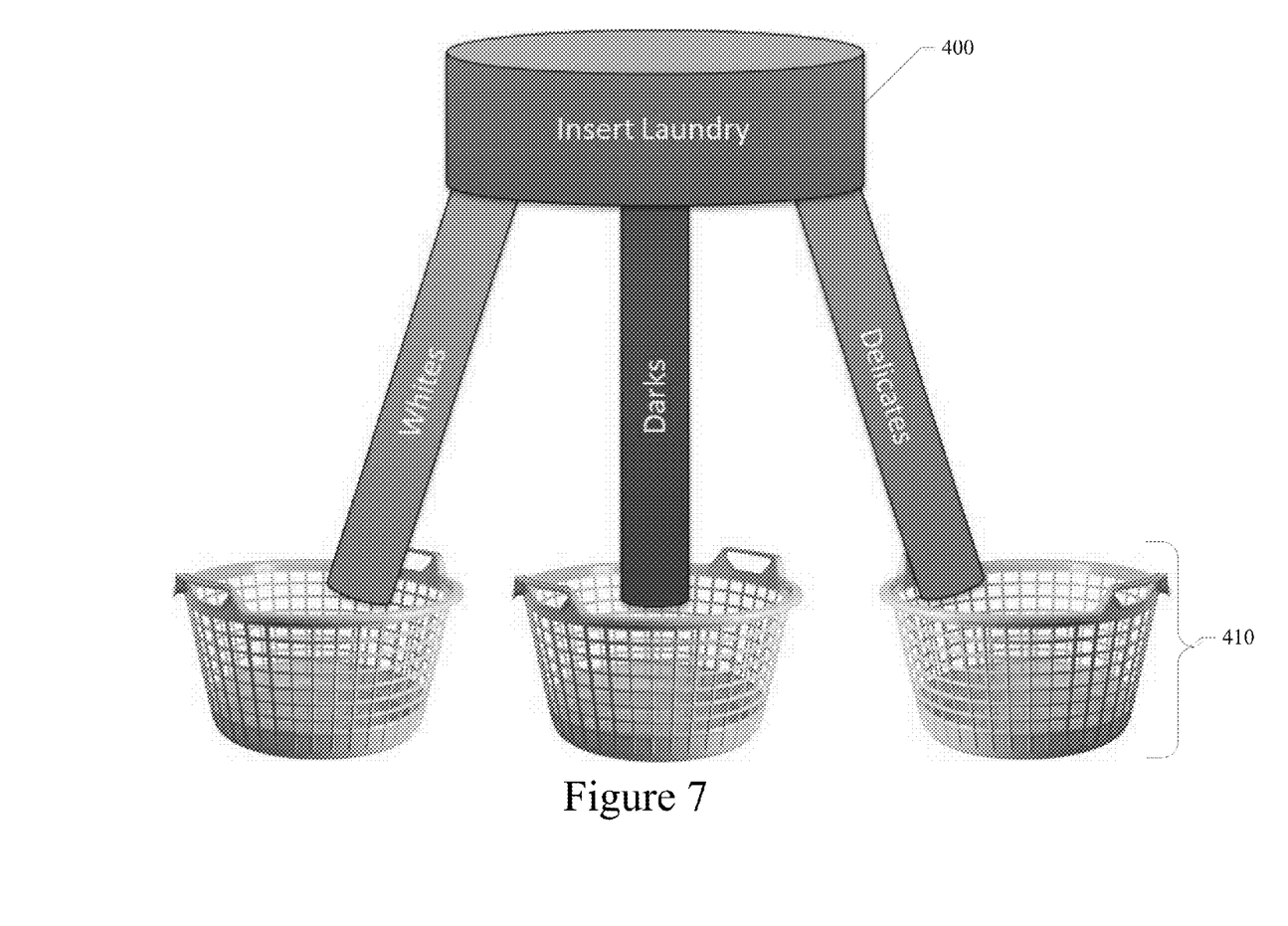
FIG. 7 illustrates an item sorter of an example embodiment.

FIG. 7 illustrates an item sorter of an example embodiment. Given the electronically readable item tags or labels 100 attached to items of clothing as described above, a particular embodiment includes a laundry sorter 400 for separating items into sorted bins 410 based on the item information read by the RFID reader 210 or the barcode/QR code scanner 235. A microcontroller of laundry sorter 400 can receive item information read from the tags 100 of items placed in the sorter 400 as described above. The microcontroller can use preconfigured logic to control the sorter 400 to separate particular items into sorted bins 410 based on the item information. Items can be sorted in a variety of groupings as defined by user-defined parameters. The laundry sorter 400 for sorting laundry based on the electronically read item information can be configured for both commercial and residential users.

In various alternative embodiments, the appliance control module as described herein can be adapted for a variety of electrical or electronic devices, appliances, or other electrical equipment, such as clothes washers, clothes dryers, steam cleaners, industrial clothes presses, dishwashers, refrigerators, or other types of appliances. The items placed into or with these appliances can be electronically tagged as described above. As also described above, the operation of the appliances can be automatically configured based on the specific item information read by the appliance control module from the items placed into or with the appliances. In this manner, the appliances can be configured to alert a user/operator regarding a variety of conditions. For example, in the case of a refrigerator, an embodiment can alert a user/operator regarding food items that are about to expire or food items that may be hazardous if consumed in a raw form. Additionally, the user/operator can be alerted regarding issues related to safety, storage, and disposal. As described above, the various embodiments can also configure the operation of the appliances based on the specific item information read from the electronic tags on each item. As a result, the various embodiments described herein provide systems and methods for electronically tagging items for use in controlling electrical devices.

In other alternative embodiments, the embedding of electronically readable item tags or labels into apparel can provide corporations and retailers with more opportunities and information to increase sales. When a consumer walks into a store, the retailer can collect sizing information that allows sales associates to guide customers to certain sections of the store. The embedding of electronically readable item tags or labels into apparel can also allow retailers to offer special sales for repeat customers or even a discount if the individual is already wearing a product that was recently purchased. This allows for a more personalized and tailored shopping experience. In addition to an improved customer experience, the inventory process can be improved and simplified using a wand that can read the electronically readable item tags or labels. A retailer can pass the wand over clothing racks and shelves to get sizing, color, and quantity information for all the products based on the tag information read from the electronically readable item tags or labels.

In addition to the advantages of the disclosed embodiments for corporations or retailers, consumers can also obtain value from the embedding of electronically readable item tags or labels into apparel as disclosed herein. For example, consumers can scan items while shopping to obtain tag information from the electronically readable item tags or labels attached to products of interest. The tag information can inform the consumer as to the materials used in the manufacture of products, their origins, dyes used, sizing information, comparison to previous purchases, wash instructions, reviews, etc. This would provide consumers more control over the purchases they make and would even help them to find items similar to previous purchases if the previously purchased items are old and worn out. Consumers worried about environmental conditions associated with the manufacturing of their clothing can find instantaneous information on the factory conditions where the garment was made as well as the sourcing of materials to avoid areas of conflict. This can help to improve work conditions, the use of sustainable materials, and reduction of pollution due to chemical processes used during manufacturing.

Thus, the example embodiments described herein provide a technical solution to a technical problem. The various embodiments improve the functioning of a variety of classes of appliances by providing electronic tagging of items used in controlling the operation of electrical devices, such as appliances. The various embodiments also serve to transform the operational state of appliances to a different and improved state by virtue of the variety of manipulations, modifications, and/or controls applied to the appliances based on the item information read from the item tags. Additionally, the various embodiments effect an improvement in a variety of technical fields including the fields of appliance control, home computing, information sharing, and device communications.

Figure 8:
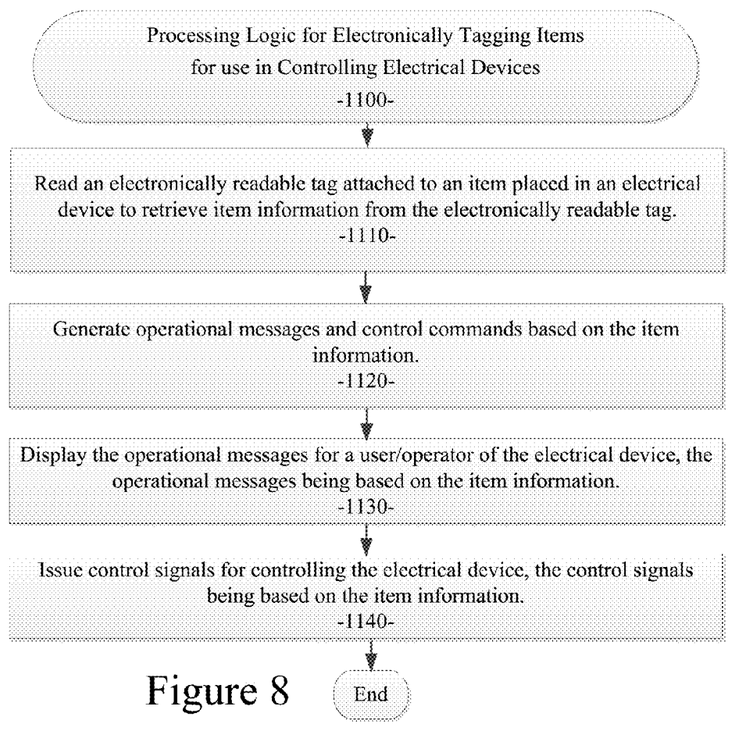
FIG. 8 is a processing flow chart illustrating an example embodiment of a method as described herein.

Referring now to FIG. 8, a processing flow diagram illustrates an example embodiment of a method 1100 for a method as described herein. The method 1100 of an example embodiment includes: reading an electronically readable tag attached to an item placed in an electrical device to retrieve item information from the electronically readable tag (processing block 1110); generating operational messages and control commands based on the item information (processing block 1120); displaying the operational messages for a user/operator of the electrical device, the operational messages being based on the item information (processing block 1130); and issuing control signals for controlling the electrical device, the control signals being based on the item information (processing block 1140).

Figure 9:
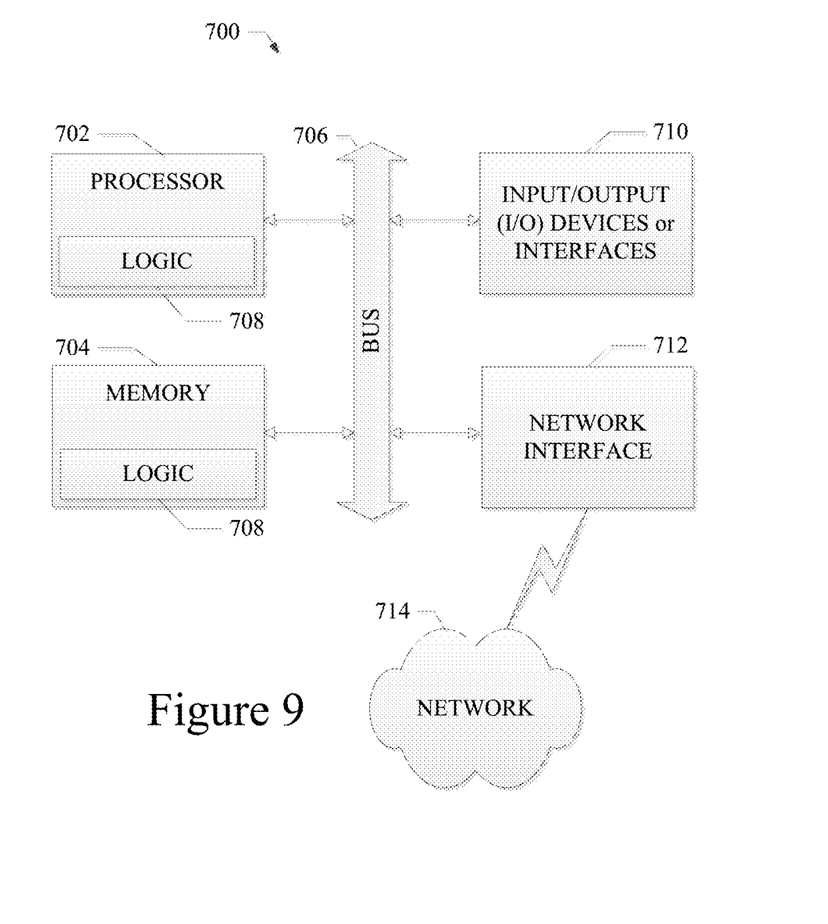
FIG. 9 shows a diagrammatic representation of a machine in the example form of a mobile computing and/or communication system within which a set of instructions when executed and/or processing logic when activated may cause the machine to perform any one or more of the methodologies described and/or claimed herein.

FIG. 9 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing and/or communication system 700 can include a data processor 702 (e.g., a System-on-a-Chip (SoC), general processing core, graphics core, and optionally other processing logic) and a memory 704, which can communicate with each other via a bus or other data transfer system 706. The computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

An apparatus comprising: a controller; a tag reader interface in data communication with the controller, the tag reader interface being configured to receive item information read from an electronically readable tag attached to an item placed in an electrical device; a display device driver in data communication with the controller for driving the display of operational messages for a user/operator of the electrical device, the operational messages being based on the item information; and an appliance interface in data communication with the controller for receiving control commands from the controller and for issuing corresponding control signals for controlling the electrical device, the control commands being based on the item information.

The apparatus as claimed above further including a scanner interface in data communication with the controller, the scanner interface being configured to receive item information read from the electronically readable tag attached to the item placed in the electrical device.

The apparatus as claimed above wherein the electronically readable tag is of a type from the group consisting of: a microchip, a radio-frequency identification (RFID) tag, a barcode, and a Quick Response (QR) code.

The apparatus as claimed above further including a network interface in data communication with the controller, the network interface being configured to enable the controller to communicate with external network resources.

The apparatus as claimed above wherein the electrical device is of a type from the group consisting of: a clothes washer, a clothes dryer, a steam cleaner, an industrial clothes press, a dishwasher, a refrigerator, and an appliance.

The apparatus as claimed above wherein the item information is of a type from the group consisting of: item care instructions, the item manufacturer, a date of manufacture or purchase, a name or identity of an owner or purchaser, and an item stock keeping unit (SKU) number.

The apparatus as claimed above being further configured to detect conflicting care needs of items placed in the electrical device.

An appliance comprising: a tag reader configured to read item information from an electronically readable tag attached to an item placed in the appliance; a display device for displaying operational messages for a user/operator of the appliance, the operational messages being based on the item information; and an appliance control module in data communication with the tag reader and the display device, the appliance control module including: a controller; a tag reader interface in data communication with the controller and the tag reader, the tag reader interface being configured to receive the item information read from the electronically readable tag attached to the item placed in the appliance; a display device driver in data communication with the controller and the display device, the display device driver for driving the display of operational messages for the user/operator of the apparatus, the operational messages being based on the item information; and an appliance interface in data communication with the controller for receiving control commands from the controller and for issuing corresponding control signals to the apparatus, the control commands being based on the item information.

The appliance as claimed above further including a scanner interface in data communication with the controller, the scanner interface being configured to receive item information read from the electronically readable tag attached to the item placed in the appliance.

The appliance as claimed above wherein the electronically readable tag is of a type from the group consisting of: a microchip, a radio-frequency identification (RFID) tag, a barcode, and a Quick Response (QR) code.

The appliance as claimed above further including a network interface in data communication with the controller, the network interface being configured to enable the controller to communicate with external network resources.

The appliance as claimed above wherein the appliance is of a type from the group consisting of: a clothes washer, a clothes dryer, a steam cleaner, an industrial clothes press, a dishwasher, and a refrigerator.

The appliance as claimed above wherein the item information is of a type from the group consisting of: item care instructions, the item manufacturer, a date of manufacture or purchase, a name or identity of an owner or purchaser, and an item stock keeping unit (SKU) number.

The appliance as claimed above being further configured to detect conflicting care needs of items placed in the appliance.

A method comprising: reading an electronically readable tag attached to an item placed in an electrical device to retrieve item information from the electronically readable tag; generating operational messages and control commands based on the item information; displaying the operational messages for a user/operator of the electrical device, the operational messages being based on the item information; and issuing control signals for controlling the electrical device, the control signals being based on the item information.

The method as claimed above further including scanning item information from the electronically readable tag attached to the item placed in the electrical device.

The method as claimed above wherein the electronically readable tag is of a type from the group consisting of: a microchip, a radio-frequency identification (RFID) tag, a barcode, and a Quick Response (QR) code.

The method as claimed above further including providing a network interface in data communication with a controller to enable the controller to communicate with external network resources.

The method as claimed above wherein the electrical device is of a type from the group consisting of: a clothes washer, a clothes dryer, a steam cleaner, an industrial clothes press, a dishwasher, a refrigerator, and an appliance.

The method as claimed above wherein the item information is of a type from the group consisting of: item care instructions, the item manufacturer, a date of manufacture or purchase, a name or identity of an owner or purchaser, and an item stock keeping unit (SKU) number.

The method as claimed above including detecting conflicting care needs of items placed in the electrical device.

An apparatus comprising: a controller means; a tag reader interfacing means in data communication with the controller means, the tag reader interfacing means being configured to receive item information read from an electronically readable tag attached to an item placed in an electrical device; a display device driving means in data communication with the controller means for driving the display of operational messages for a user/operator of the electrical device, the operational messages being based on the item information; and an appliance interfacing means in data communication with the controller means for receiving control commands from the controller means and for issuing corresponding control signals for controlling the electrical device, the control commands being based on the item information.

The apparatus as claimed above further including a scanner interfacing means in data communication with the controller means, the scanner interfacing means being configured to receive item information read from the electronically readable tag attached to the item placed in the electrical device.

The apparatus as claimed above wherein the electronically readable tag is of a type from the group consisting of: a microchip, a radio-frequency identification (RFID) tag, a barcode, and a Quick Response (QR) code.

The apparatus as claimed above further including a network interfacing means in data communication with the controller means, the network interfacing means being configured to enable the controller means to communicate with external network resources.

The apparatus as claimed above wherein the electrical device is of a type from the group consisting of: a clothes washer, a clothes dryer, a steam cleaner, an industrial clothes press, a dishwasher, a refrigerator, and an appliance.

The apparatus as claimed above wherein the item information is of a type from the group consisting of: item care instructions, the item manufacturer, a date of manufacture or purchase, a name or identity of an owner or purchaser, and an item stock keeping unit (SKU) number.

The apparatus as claimed above being further configured to detect conflicting care needs of items placed in the electrical device.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
   a controller;
   a tag reader interface in data communication with the controller, the tag reader interface being configured to receive item information read from each of a plurality of electronically readable tags directly attached to each of a plurality of items placed in an electrical device, the plurality of items being placed in the electrical device for each cycle of the device, the electrical device being of a type from the group consisting of: a clothes washer, a clothes dryer, a steam cleaner, an industrial clothes press, a dishwasher, and a refrigerator;
   a display device driver in data communication with the controller for driving the display of operational messages for a user/operator of the electrical device, the operational messages being based on the item information from the plurality of items in the electrical device; and
   an appliance interface in data communication with the controller for receiving control commands from the controller and for issuing corresponding control signals for controlling the electrical device, the control commands being based on the item information from the plurality of items in the electrical device, the controller being further configured to detect conflicting care needs of the plurality of items placed in the electrical device.

2. The apparatus as claimed in claim 1 further including a scanner interface in data communication with the controller, the scanner interface being configured to receive item information read from each of the electronically readable tags directly attached to each of the plurality of items placed in the electrical device.

3. The apparatus as claimed in claim 1 wherein each of the electronically readable tags is of a type from the group consisting of: a microchip, a radio-frequency identification (RFID) tag, a barcode, and a Quick Response (QR) code.

4. The apparatus as claimed in claim 1 further including a network interface in data communication with the controller, the network interface being configured to enable the controller to communicate with external network resources.

5. The apparatus as claimed in claim 1 wherein the item information is of a type from the group consisting of: item care instructions, the item manufacturer, a date of manufacture or purchase, a name or identity of an owner or purchaser, and an item stock keeping unit (SKU) number.

6. An appliance comprising:
   a tag reader configured to read item information from each of a plurality of electronically readable tags directly attached to each of a plurality of items placed in the appliance, the plurality of items being placed in the appliance for each cycle of the appliance, the appliance being of a type from the group consisting of: a clothes washer, a clothes dryer, a steam cleaner, an industrial clothes press, a dishwasher, and a refrigerator;
   a display device for displaying operational messages for a user/operator of the appliance, the operational messages being based on the item information from the plurality of items in the appliance; and
   an appliance control module in data communication with the tag reader and the display device, the appliance control module including:
   a controller;
   a tag reader interface in data communication with the controller and the tag reader, the tag reader interface being configured to receive the item information read from each of the electronically readable tags directly attached to each of the plurality of items placed in the appliance;
   a display device driver in data communication with the controller and the display device, the display device driver for driving the display of operational messages for the user/operator of the appliance, the operational messages being based on the item information from the plurality of items in the electrical device; and
   an appliance interface in data communication with the controller for receiving control commands from the controller and for issuing corresponding control signals to the appliance, the control commands being based on the item information from the plurality of items in the appliance, the controller being further configured to detect conflicting care needs of the plurality of items placed in the appliance.

7. The appliance as claimed in claim 6 further including a scanner interface in data communication with the controller, the scanner interface being configured to receive item information read from each of the electronically readable tags directly attached to each of the plurality of items placed in the appliance.

8. The appliance as claimed in claim 6 wherein each of the electronically readable tags is of a type from the group consisting of: a microchip, a radio-frequency identification (RFID) tag, a barcode, and a Quick Response (QR) code.

9. The appliance as claimed in claim 6 wherein the item information is of a type from the group consisting of: item care instructions, the item manufacturer, a date of manufacture or purchase, a name or identity of an owner or purchaser, and an item stock keeping unit (SKU) number.

10. The appliance as claimed in claim 6 further including a network interface in data communication with the controller, the network interface being configured to enable the controller to communicate with external network resources.

11. A method comprising:
    reading each of a plurality of electronically readable tags directly attached to each of a plurality of items placed in an electrical device to retrieve item information from each of the electronically readable tags, the plurality of items being placed in the electrical device for each cycle of the device, the electrical device being of a type from the group consisting of: a clothes washer, a clothes dryer, a steam cleaner, an industrial clothes press, a dishwasher, and a refrigerator;
    generating operational messages and control commands based on the item information from the plurality of items in the electrical device;
    displaying the operational messages for a user/operator of the electrical device, the operational messages being based on the item information from the plurality of items in the electrical device;
    detecting conflicting care needs of the plurality of items placed in the electrical device; and issuing control signals for controlling the electrical device, the control signals being based on the item information from the plurality of items in the electrical device.

12. The method as claimed in claim 11 further including scanning item information from each of the electronically readable tags directly attached to each of the plurality of items placed in the electrical device.

13. The method as claimed in claim 11 wherein each of the electronically readable tags is of a type from the group consisting of: a microchip, a radio-frequency identification (RFID) tag, a barcode, and a Quick Response (QR) code.

14. An apparatus comprising:

a controller means;

a tag reader interfacing means in data communication with the controller means, the tag reader interfacing means being configured to receive item information read from each of a plurality of electronically readable tags directly attached to each of a plurality of items placed in an electrical device, the plurality of items being placed in the electrical device for each cycle of the device, the electrical device being of a type from the group consisting of: a clothes washer, a clothes dryer, a steam cleaner, an industrial clothes press, a dishwasher, and a refrigerator;

a display device driving means in data communication with the controller means for driving the display of operational messages for a user/operator of the electrical device, the operational messages being based on the item information from the plurality of items in the electrical device; and an appliance interfacing means in data communication with the controller means for receiving control commands from the controller means and for issuing corresponding control signals for controlling the electrical device, the control commands being based on the item information from the plurality of items in the electrical device, the controller means being further configured to detect conflicting care needs of the plurality of items placed in the electrical device.

15. The apparatus as claimed in claim 14 wherein each of the electronically readable tags is of a type from the group consisting of: a microchip, a radio-frequency identification (RFID) tag, a barcode, and a Quick Response (QR) code.

* * * * *